Oct. 10, 1933.   H. G. MACLENNAN   1,930,174
PORTABLE VULCANIZING DEVICE FOR REPAIRING VEHICLE TIRES AND
OTHER ARTICLES COMPOSED PARTLY OR WHOLLY OF RUBBER
Filed July 11, 1931

Inventor
H. G. Maclennan
By [signature]
Atty.

Patented Oct. 10, 1933

1,930,174

UNITED STATES PATENT OFFICE 1,930,174

PORTABLE VULCANIZING DEVICE FOR REPAIRING VEHICLE TIRES AND OTHER ARTICLES COMPOSED PARTLY OR WHOLLY OF RUBBER

Hamish Graeme Maclennan, St. Kilda, Victoria, Australia

Application July 11, 1931, Serial No. 550,232, and in Australia July 15, 1930

3 Claims. (Cl. 18—18)

This invention relates to portable vulcanizing devices of the well known kind comprising a pan containing a body of combustible material and having a section of rubber dough or a repair patch applied to the bottom of the pan, so that when the device is pressed with its repair patch in contact with the article to be repaired and the combustible material is ignited, the patch becomes vulcanized to the article to effect the repair.

It has been found that in existing devices the combustible material, being unprotected, deteriorates under atmospheric influences, particularly where moisture is prevalent, with the result that in many instances difficulty is experienced in igniting the combustible material and that it does not generate sufficient heat to effect entirely satisfactory vulcanization. Furthermore, if the devices are exposed, rain, dust and other foreign matter may collect upon the combustible material and render it inefficient.

The present invention provides an improved vulcanizing device of the general kind indicated, but in which the combustible pad or body is thoroughly protected from atmospheric and other harmful influences. A device according to this invention comprises a metal pan having a pad or body of combustible material disposed therein, the combustible material being covered by a combustible moisture-proof covering such as wax or varnished coated paper, cardboard or the like. The combustible moisture-proof covering is retained within the metal pan by suitably distorting or bending the upstanding peripheral lip of the pan or the marginal edge of the covering. By such means the covering is securely retained in position so as to form an effective moisture-proof seal for the combustible pad. When using the device, a portion of the combustible moisture-proof covering may be scratched away or removed to thereby permit ready ignition of the combustible pad by a match.

Preferably the wall of the pan upstands above the body of combustible material and co-acts with the marginal portions of the protective material or element in order to retain the latter in position and thus exclude air, moisture or other foreign matter from the combustible material.

Referring to the drawing which forms part of this specification:—

Figure 1:
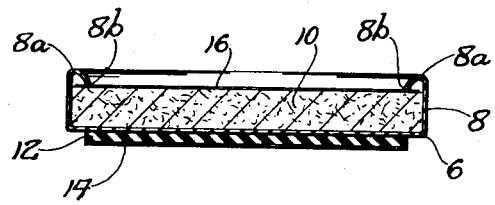
Figure 1 is an enlarged sectional view of a vulcanizing device according to one form of the invention.

In the drawing the numeral 6 indicates the pan composed of comparatively thin metal and having an upstanding peripheral wall or lip 8. The pan accommodates a body 10 of suitable combustible material. A repair patch or body 12 of rubber dough or the like is adhered to the bottom of the pan and is preferably protected by a removable strip or layer 14 of some suitable material.

In accordance with this invention the upper surface of the combustible material 10 is covered by a moisture proof protective material or element 16 which is of a combustible nature.

The combustible material 16 may advantageously consist of waxed or varnished paper, cardboard or the like, the wax or other impregnation or coating being of sufficient strength or depth to ensure the exclusion of moisture and other harmful elements. The combustible protective element 16 may lie upon the upper surface of the combustible material 10 as in Figure 1, and the upper edge of the pan wall 8 which projects above the combustible material 10 may be turned or bent inwardly and downwardly as at 8a so that its edge 8b contacts with the marginal portion of the protective element and thus forms a seal therefor as in Figure 1.

Figure 2:
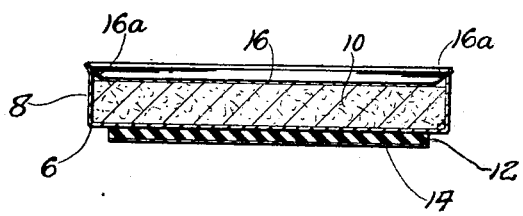
Figure 2 is an enlarged sectional view according to another form of the invention.

According to the embodiment illustrated in Figure 2, the protective element or material 16 is normally of slightly greater width or diameter than the pan 6 and is forced thereinto so as to lie upon the upper surface of the combustible material 10 with the marginal edge portions 16a of the protective element upturned to form a tight fit against the upstanding wall 8 of the pan. The wall 8 in such instances will not be curved inwardly, but may, if desired, be curved outwardly at its upper edge in order to prevent it from presenting a relatively sharp edge.

Although ignition of the combustible covering 16 may be sufficient to ignite the underlying pad 10, it may be necessary or advisable when using the device to first remove a small portion of the combustible covering 16 to afford access to the combustible pad 10 for ignition thereof. The remainder of the covering 16 will burn readily with the body 10.

Having now described my invention what I claim as new and desire to secure by Letters Patent is:—

1. Improvements in vulcanizing devices of the kind indicated, comprising in combination a metal pan having a marginal wall having a free lip portion arranged in a plane out of the normal plane of the wall, a body of combustible material within said pan, and a moisture-proof covering of a combustible nature extending over said combustible material and within said lip, the peripheral lip of the pan and the marginal portion of said covering having interengagement to securely retain the covering within the pan to thereby form a moisture-proof seal for the combustible body.

2. Improvements in vulcanizing devices as claimed in claim 1, characterized in that the peripheral lip of the pan upstands above said combustible body and is turned inwardly and downwardly so that it contacts with the marginal portions of said combustible moisture-proof covering, for the purpose specified.

3. Improvements in vulcanizing devices as claimed in claim 1, wherein said combustible moisture-proof covering is normally of greater width or diameter than said pan and is forced therein so that the marginal portions of the covering are upturned to form a tight fit against the adjacent portions of said pan lip above the enclosed combustible material.

HAMISH GRAEME MACLENNAN.